Aug. 25, 1964     W. J. ROLAND     3,146,295
OPHTHALMIC MOUNTING FOR A FACE MASK
Filed March 29, 1961     2 Sheets-Sheet 1
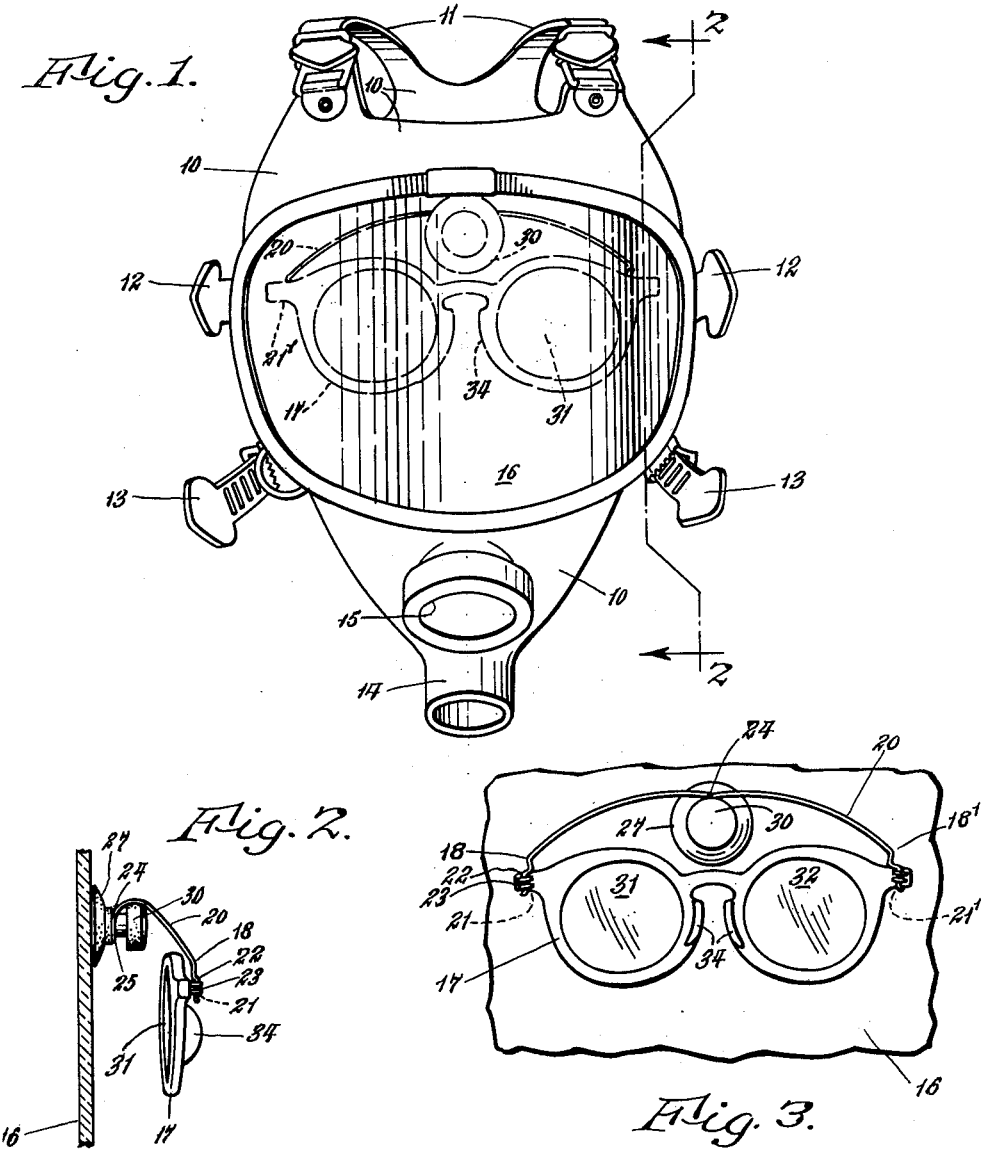
INVENTOR.
Wesley J. Roland
BY
Walter H. Popp.
ATTORNEY.

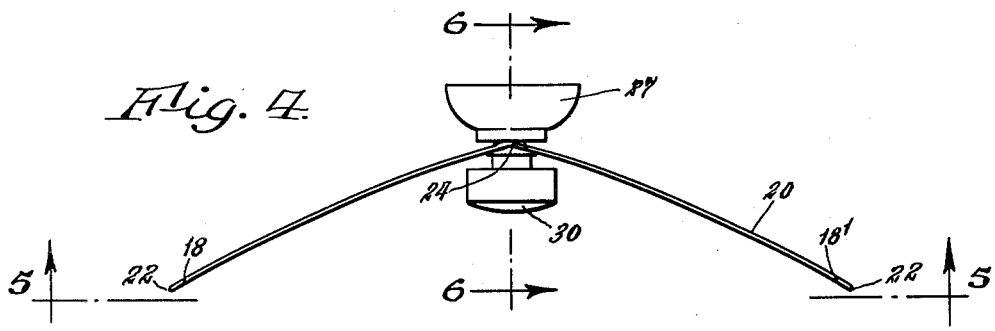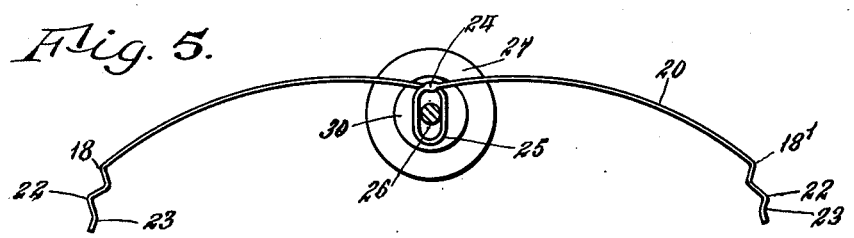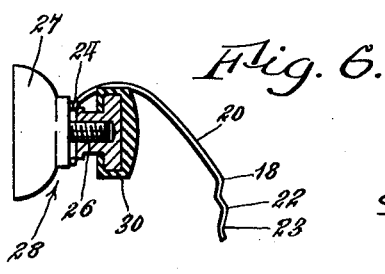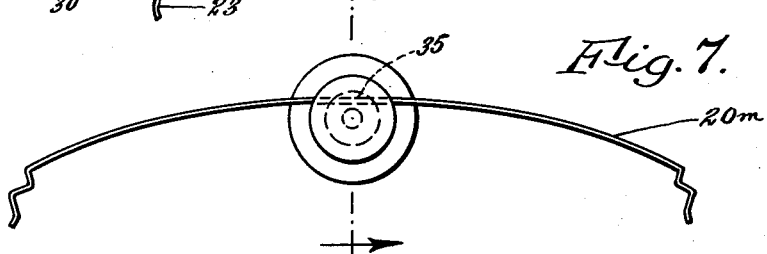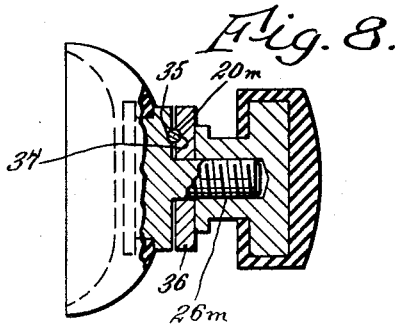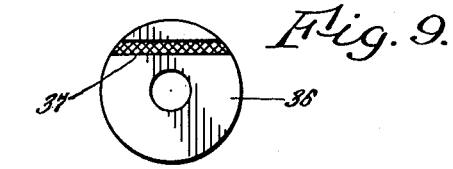
INVENTOR.
Wesley J. Roland
BY
Walter H. Popp.
ATTORNEY.

United States Patent Office 3,146,295
Patented Aug. 25, 1964

3,146,295
OPHTHALMIC MOUNTING FOR A FACE MASK
Wesley J. Roland, Alden, N.Y., assignor to Scott Aviation Corporation, Lancaster, N.Y.
Filed Mar. 29, 1961, Ser. No. 99,224
1 Claim. (Cl. 88—51)

This invention relates to a means for mounting an eye glass frame in a face mask or in any other mask, eye shield, or in a pair of goggles having a transparent window which covers the eyes of the wearer.

The principal object of the invention is to enable an eye glass frame provided with the usual corrective lenses, and normally used independently of a face mask, to be optionally used in conjunction with a standard face mask by being detachably secured to the mask itself and not be dependent upon the usual mounting of said eye glass frame upon the nose or the nose and ears of the person who is wearing the glasses.

Other collateral objects of the invention and practical solutions thereof are described in detail in the herein specification and disclosed in the accompanying drawings, wherein:

FIG. 1 is a front elevation of a standard, full-face mask 10 showing a typical eye glass frame 17 secured to the window 16 of said mask by means of my improved ophthalmic mounting.

FIG. 2 is a fragmentary, vertical section thereof, taken on line 2—2, FIG. 1.

FIG. 3 is also a fragmentary, vertical section thereof, but taken just back of the ophthalmic mounting and looking forwardly.

FIG. 4 is an enlarged, top plan view of my improved ophthalmic mounting, showing the same detached from both the mask 10 and the eye glass frame 17.

FIG. 5 is also an enlarged, vertical section thereof, but with the clamping nut removed and looking forwardly, and taken in line 5—5, FIG. 4.

FIG. 6 is an enlarged, vertical section, partly in elevation, through the one form of my ophthalmic mounting, taken on line 6—6, FIG. 4.

FIG. 7 is a vertical, rear elevation, somewhat similar to FIG. 5 but showing a modified form of my invention.

FIG. 8 is a greatly enlarged, vertical section thereof, taken on line 8—8, FIG. 7.

FIG. 9 is a greatly enlarged, rear elevation of the clamping washer 33 of the modified construction of FIGS. 7–9, showing said washer completely detached from the rest of this modified form of ophthalmic mounting.

For convenience, the present invention and the full face mask 10 to which it is adapted to be secured, will be described exactly as it is here illustrated. However, it is to be understood that the scope of the invention is to be measured solely by its intrinsic novelty as well as by the scope of the appended claim.

FIGS. 1–6

In FIG. 1 is shown a full face type of mask 10 having the usual forehead straps 11 and cheek straps 12 and 13 which enable said mask to be adjustably and firmly held against the face of the person who is wearing the mask, so as to exclude water, or noxious ambient gases or unduly low-pressure, ambient atmosphere. Such a standard mask also includes the usual inhalation duct 14, exhalation duct 15 and a transparent window 16.

Such a mask does not conveniently and air-tightly fit over the face of a person who is wearing glasses in the normal manner, and the fudamental object of the present invention is to provide an ophhtalmic mounting means whereby a person can mount the eye glass frame 17 of his regular glasses in a standard face mask.

In mounting this eye glass frame 17 of his regular or ordinarly worn glasses (not shown completely assembled), the person desiring to don the mask 10 first removes from said eye glass frame 17, the usual ear piece temples (not shown) together with their usual pivot pins (not shown), which latter normally pivotally connect said temples with the eye glass frame 17.

This means that with the present invention, he does not have to be provided with a special eye glass frame for use with a mask and which is only of functional value when he is wearing a mask. Nor does the mask itself, in this invention, have to be of any special type.

Having separated the eye glass frame 17 from the rest of his regularly worn glasses, the person desiring to don the mask 10 first grasps the two termini 18 and 18' of the connecting means 20, and resiliently pushes said termini into the temple pivot holes 21 and 21'. This connecting means 20 is constructed of resilient wire (piano wire) and each of its two termini 18 and 18' is dually bent at 22 and 23 so that the downward movement of said termini will be limited by the upper bends 22, while the lower bends 23 will enable said termini to grasp the bore of the temple pivot holes 21, 21' in a firm and resilient manner.

Centrally of the connecting means 20, the piano wire of which it is constructed is crossed (see FIG. 5) and swaged at 24, forming the vertically elongated loop 25 whose inner width is only slightly greater than the outer diameter of the threaded stud 26. The latter is coaxially molded in suction cup 27 that is the principal component of a securing base 28, and has screwed into its distal end a clamping knob 30, whose core is metal but is preferably rubber covered so as to lessen the risk of cracking the corrective lenses 31 and 32 in the eye glass frame 17.

When the clamping knob 30 is tightened, the connecting means 20 is tightly clamped to the securing base 28, but before this is done, said connecting means 20 is first moved up or down, or swivelled, until the eye glass frame 17 is arranged, relatively to the securing base 28, to approximately at least suit the particular mask and the particular face of the person who is about to don the mask.

After tightening said clamping knob 30, the person who is about to don the mask, takes the whole ophthalmic mounting, together with his eye glass frame 17, and places this entire assembly within the mask 10, and suitably locates it approximately therein, and then pushes the suction cap 27 against the inner surface of the window 16, in the manner common to all suction cups. If the mask and its appurtenances do not properly and comfortably fit the person's face, he can either loosen the clamping knob 30 (while the suction cup 27 is still in place), or he can pull off said suction cup entirely from the window 16, and then re-adjust the relationship of the various parts in such manner as may seem desirable.

When the eye glass frame 17 is in proper position, its nose pads 34 are resiliently pushed back firmly against opposite sides of the wearer's nose because of the resilient character of the connecting means 20.

FIGS. 7–9

These figures disclose a simplified form of my invention in which the loop 25 and the swaging 24 of FIGS. 1–6 are eliminated. In the present construction the inner face of the metal base of the threaded stud 26m is so formed as to provide a straight, horizontal, knurled groove 35. The latter is adapted to frictionally receive the front face of the central portion of a resilient connecting means 20m, and to be frictionally clamped firmly therein by a clamping washer 36 (see FIG. 9) having a straight, knurled groove 37 similar to groove 35.

I claim:

An ophthalmic mounting for securing an eyeglass frame to a face mask and the like comprising, in combination with an eyeglass frame having a pair of temple pivot holes normally pivotally receiving a pair of earpiece temples which have been removed from said frame, a suction cup securing base adapted for attachment to a face mask, a clamping knob, a threaded stud extending between said base and said knob for tightening of the latter on the former, and a resilient connecting wire having a vertically elongated central portion clamped about said stud and against said base by said knob, said central portion enabling vertical and swivelling adjustment of said connecting wire on said base upon releasing said clamping knob, said wire extending laterally outwardly from opposite sides of said base, the opposite ends of said connecting wire having downwardly extending termini slip-fitting into said eyeglass frame temple pivot holes, said termini being bent for firm, resilient engagement in said pivot holes.

References Cited in the file of this patent

UNITED STATES PATENTS

| | | |
|---|---|---|
| 349,018 | Waddell | Sept. 14, 1886 |
| 404,803 | Smith | June 4, 1889 |
| 437,030 | Hinden | Sept. 23, 1890 |
| 2,234,729 | Montalvo et al. | Mar. 11, 1941 |
| 2,388,713 | Schutz et al. | Nov. 13, 1945 |
| 2,674,158 | Curtet | Apr. 6, 1954 |
| 2,905,172 | Rodenhouse | Sept. 22, 1959 |
| 2,951,418 | Bitner et al. | Sept. 6, 1960 |
| 3,004,535 | Nielson | Oct. 17, 1961 |
| 3,051,957 | Chan | Sept. 4, 1962 |

FOREIGN PATENTS

| | | |
|---|---|---|
| 335,128 | Germany | Mar. 24, 1921 |
| 699,153 | Germany | Nov. 23, 1940 |
| 480,600 | Great Britain | Feb. 24, 1938 |
| 1,248,277 | France | Oct. 31, 1960 |